United States Patent
Buchan

[11] 3,655,266
[45] Apr. 11, 1972

[54] VARIABLE ELECTRO-OPTIC ELEMENT

[72] Inventor: William R. Buchan, Lincoln, Mass.
[73] Assignee: Itek Corporation, Lexington, Mass.
[22] Filed: Aug. 31, 1970
[21] Appl. No.: 68,265

[52] U.S. Cl. .................... 350/150, 350/162 ZP, 356/106 R
[51] Int. Cl. ........................................................... G02f 1/20
[58] Field of Search ............... 350/150, 162 ZP, 162 SF, 3.5; 356/106 R, 112

[56] References Cited

UNITED STATES PATENTS

| | | | |
|---|---|---|---|
| 3,566,130 | 2/1971 | Aldrich et al. | 350/150 X |
| 3,122,601 | 2/1964 | Williams | 350/162 ZP |
| 3,499,703 | 3/1970 | De Bitetto | 350/162 ZP |

OTHER PUBLICATIONS

Fleisher, " Radiation Controlled Radiation Gate" IBM Tech. Discl. Bull. Vol. 6, No. 3 (Aug. 1963) pp. 73– 74.

*Primary Examiner*—David Schonberg
*Assistant Examiner*—Paul R. Miller
*Attorney*—Homer O. Blair, Robert L. Nathans, David E. Brook, Lester S. Grodberg and Joseph S. Iandiorio

[57] ABSTRACT

A variable optical device for varying the shape of a wavefront is disclosed including an electro-optic medium whose index of refraction varies as a function of the intensity of an applied electric field and means for applying to that medium an electric field whose intensity varies in a pattern representative of the spatial variation of the index of refraction of the medium required to vary the shape of a wavefront in some predetermined manner.

22 Claims, 3 Drawing Figures

Patented April 11, 1972
3,655,266
2 Sheets-Sheet 1
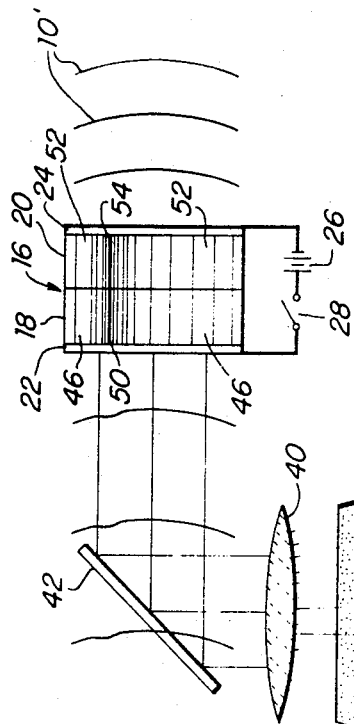
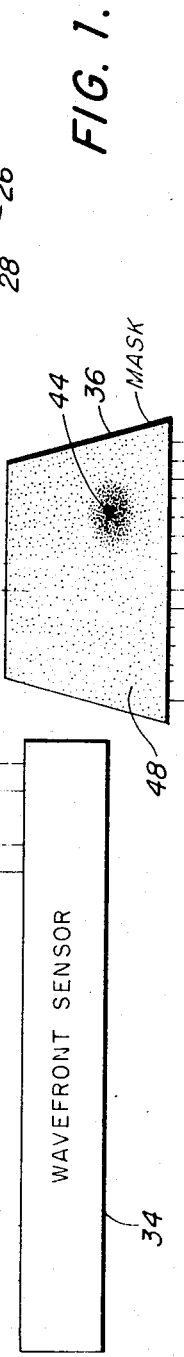
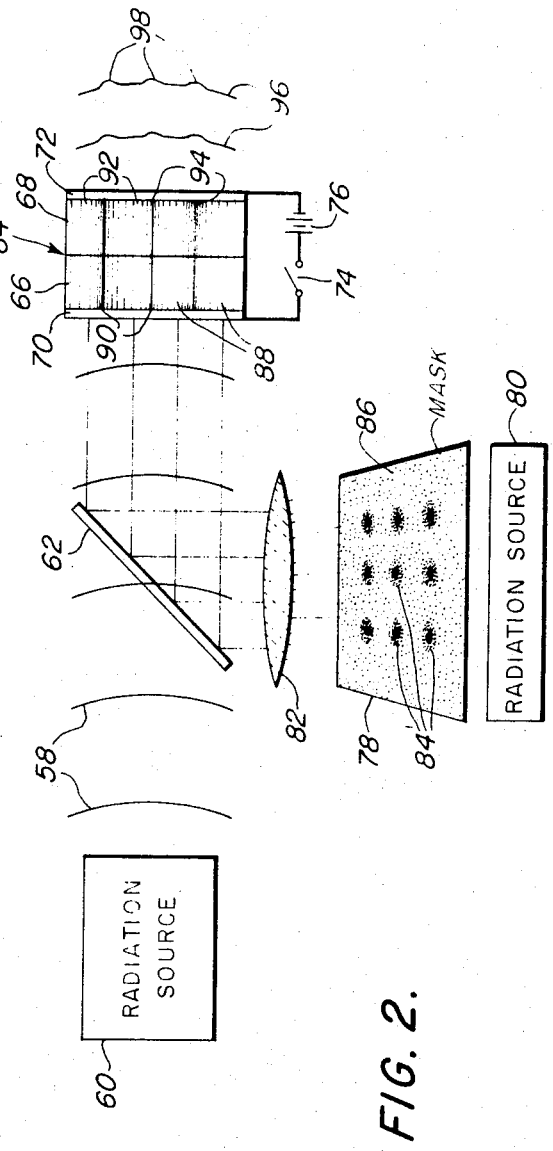
FIG. 1.
FIG. 2.
WILLIAM R. BUCHAN
INVENTOR.
BY Jandiorio & Grodberg
ATTORNEYS.

WILLIAM R. BUCHAN
INVENTOR.

BY

Jandiorio & Grodberg
ATTORNEYS.

VARIABLE ELECTRO-OPTIC ELEMENT

CHARACTERIZATION OF INVENTION

The invention is characterized in a variable optical device for varying the shape of a wavefront comprising an electro-optic medium whose index of refraction varies as a function of the intensity of an applied electric field, and means for applying to the electro-optic medium an electric field whose intensity varies in a pattern that produces a spatial variation of the index of refraction of the electro-optic medium resulting in a variation in the shape of a wavefront producible by the electro-optic medium.

BACKGROUND OF INVENTION

This invention relates to a variable optical device whose index of refraction may be varied to produce a wavefront of predetermined shape.

Conventional optical elements and systems though made with the greatest skill and precision still are not always totally free of imperfections that may cause variations and distortions of radiation subject to them. For example, fabricated optical systems of more than one element must be carefully aligned and the individual elements must be as nearly perfect as possible. Often individual elements must be removed, replaced, re-ground, or re-positioned to improve a desired characteristic of the system such as its ability to produce symmetrical wavefronts, or wavefronts of a particular shape. Moreover, even when such elements and systems have been produced with the proper precision, other variables such as aging or variation in the ambient conditions at the location where they are used may introduce distortions. Errors which vary with time are a serious problem in many optical installations because real time correction systems are expensive and complicated.

SUMMARY OF INVENTION

Thus it is desirable to have available a variable optical device whose index of refraction may be varied in a pattern to produce a wavefront of predetermined shape.

It is also desirable to have available such a device whose index of refraction pattern may be varied quickly, inexpensively, and accurately using an electric field.

It is also desirable to have available such a device whose index of refraction pattern, once established, may be stored or may be continually variable in response to a monitoring system.

The invention may be accomplished by a variable optical device for varying the shape of a wavefront including an electro-optic medium whose index of refraction varies as a function of the intensity of an applied electric field. Associated with that medium are means for applying to the medium an electric field whose intensity varies in a pattern that produces a spatial variation of the index of refraction of the electro-optic medium in conformity with the desired shape of a wavefront to be produced by the medium.

DISCLOSURE OF PREFERRED EMBODIMENT

Other objects, features and advantages will occur from the following description of a preferred embodiment and the accompanying drawings, in which:

FIG. 1 is a diagrammatic view of a variable optical device according to this invention being operated in a real time mode to produce a desired wavefront with the mask that provides the variations in the electric field intensity shown in perspective.

FIG. 2 is a diagrammatic view of a variable optical device according to this invention being operated in a storage mode to produce a desired correction to a distorted wavefront from an optical system with corrector mask shown in perspective.

Figure 3:
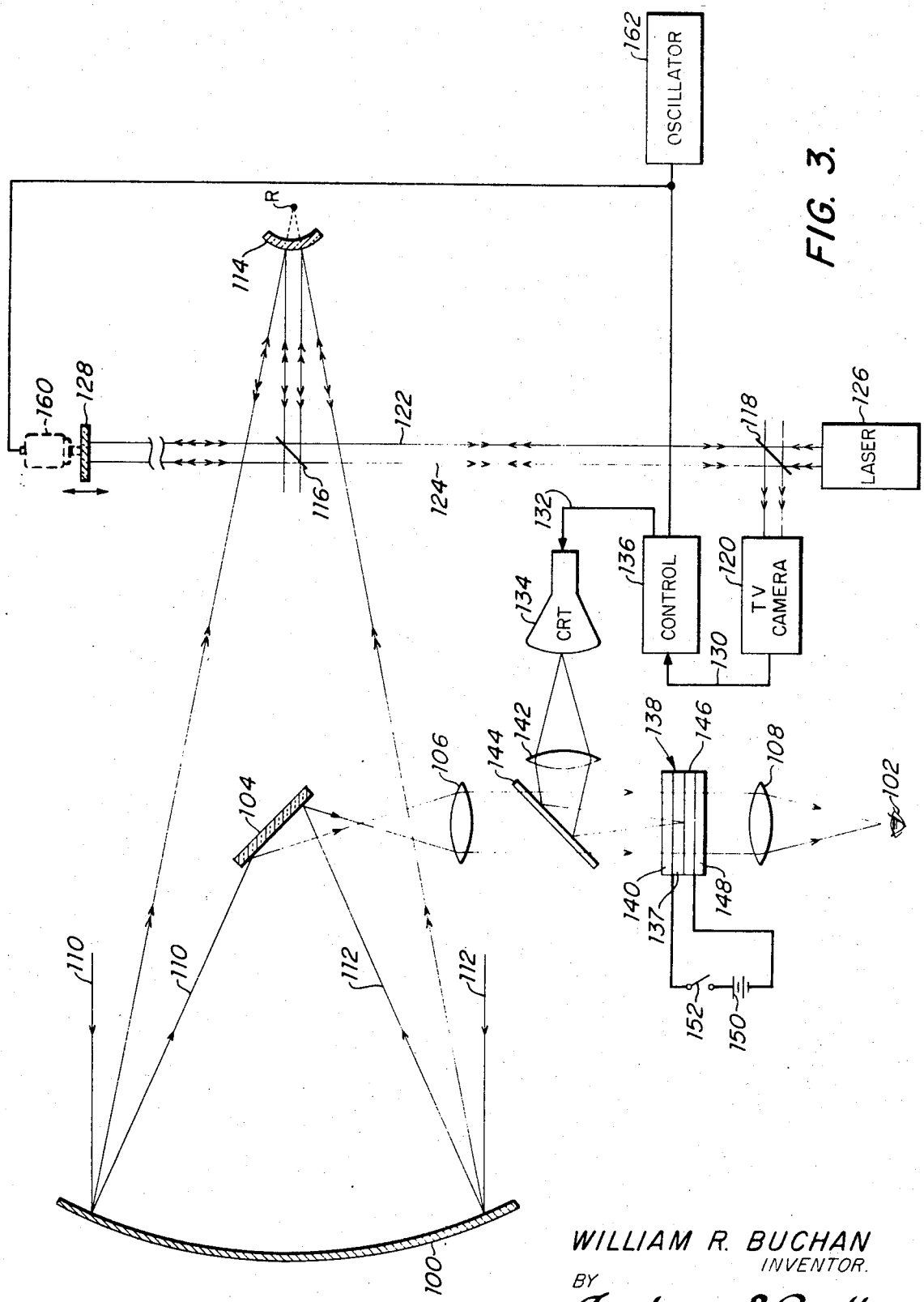
FIG. 3 is a diagrammatic view of a variable optical device according to this invention being operated in a real time mode in a system for correcting distortions of wavefronts caused by changes in a concave radiation reflector.

The invention may be embodied in a device which includes an electro-optic layer whose index of refraction varies as a function of an applied electric field and a photoconductive layer adjacent each other between a pair of electrodes. A battery connected across the electrodes may be used to provide an electric field across the two layers. The photoconductive layer is exposed to radiation in a pattern that varies the conductivity of that layer and thus the intensity of the electric field across the electro-optic layer in a pattern required to vary the index of refraction of the electro-optic layer in a pattern required to produce a particular wavefront contour. For example, should the device be functioning as a corrector for a distorted wavefront, the areas of the electro-optic medium that are to pass lagging portions of the wavefront are subjected to lower intensity electric field and the areas that are to pass leading portions of the wavefront are subjected to a higher intensity electric field, than those that are to pass the properly aligned portions of the wavefront. In this manner the index of refraction n may be varied spatially throughout the electro-optic medium to establish the proper effect on the wavefront. When the higher intensity electric field produces a higher index of refraction, and since the index of refraction n is defined as:

$n = v_0/v_m$ where $v_0$ is the speed of radiation in a vacuum and $v_m$ is the speed of radiation in another medium, the areas of higher index of refraction pass radiation at a slower speed than the areas of lower index of refraction. Therefore the leading portions of the wavefront are slowed down relative to the lagging portions so that both such portions align with the aligned portions of the wavefront and the distortion is corrected. Were the electro-optic medium one in which the index of refraction decreases with increases of electric field intensity, the field strengths applied would be oppositely arranged. The variation in the electric field intensity in the electro-optic layer may be produced by projecting on to the photoconductive layer an image of a mask whose density varies in a pattern similar to the variations to be imposed on the wavefront. The radiational wavefront whose form is to be varied may be subjected to the device either during or after the exposure of the photoconductive layer.

If the electro-optic layer is also an electrically insulating layer, the battery may be disconnected after the exposure of the photoconductive layer and the charges that migrated while the photoconductive layer was exposed to the mask will be trapped due to the blocking action of the electro-optic layer and the index of refraction variation pattern is fixed in the device. The device may be erased and reused by shorting the electrodes during a subsequent uniform exposure of the photoconductive layer.

If the electro-optic layer is not also an electrical blocking layer, the device only functions as a real time device, i.e., the desired variations in the wavefront shape are imposed only while the image of the mask is present at the photoconductive layer.

It can also be arranged that the electric field in the electro-optic layer is maintained even if the battery is disconnected after the exposure of the photoconductive layer to the mask. For this purpose an electrically insulating material may be used for the electro-optic layer together with a photoconductive layer of very high dark resistance so that electric charges become trapped at or near the interface of the electro-optic and photoconductive layers. Alternatively a ferroelectric material may be used for the electro-optic layer in which a pattern of different states of electrical polarization are induced by exposure of the photoconductive layer to a pattern of radiation.

Other mediums and materials such as photoelectrets, ferroelectric materials, and others may be used alone or in various combinations to produce similar results. Able to vary wavefront shapes by means of this invention are devices having an electro-optic layer of e.g. KDP, DKDP, lithium niobate combined with a photoconductive layer of e.g. amorphous ZnS, ZnSe, ZnTe, CdS; or devices having a layer containing both an electro-optic and photoconductive medium e.g. ZnS, ZnSe, ZnTe; combined with a blocking layer e.g. polystyrene, SiO$_2$; or a device having a layer containing an electro-optic and a ferroelectric medium e.g. bismuth titanate combined with a layer of an amorphous photoconductor. The storage devices may be distinguished from the momentary or real time devices by presence of a blocking medium for preventing charge leakage to maintain the electric field for a substantial period of time. The blocking medium may be a separate dielectric layer or may be an electro-optic medium which also functions as a blocking layer.

The invention may be used to correct the shape of wavefronts 10 having lagging portions 12 produced by distortions introduced to radiation from coherent light source or laser 15 by an optical system 14, FIG. 1. The wavefronts 10 are submitted to a device 16 according to this invention which includes a photoconductive layer 18 and electro-optic layer 20 between electrodes 22, 24 energized by battery 26 through switch 28. A partially reflecting mirror 30 transmits to device 16 a portion of the radiation from optical system 14 and reflects a portion of that radiation to wavefront sensor 34. A wavefront sensor 34 such as an interferometer of the Mach Zender type may be used to compare the input to optical system 14 received from partially reflecting mirror 32 with the output from system 14 from partially reflecting mirror 30 to determine the distortion of wavefronts 10. A photosensitive medium such as photographic film may be exposed by the output from sensor 34 to form a mask in the form of a pattern representative of the wavefront, or the representation produced by the sensor may be used to conform the output of a radiation source to an image required to change the shape of the wavefront. In FIG. 1 the image of mask 36 irradiated by radiation source 38 is projected by lens 40 to partially reflecting mirror 42 which reflects that image to device 16 while simultaneously transmitting wavefronts 10 to device 16: the photoconductive layer 18 is sensitive to the radiation from source 38 but transmits the radiation of wavefronts 10 without effect. The image of mask 36 contains a dark spot 44 corresponding to the position of lagging portion 12 of wavefronts 10. Spot 44 is darkest at its center corresponding to the deepest part of lagging portion 12 and gradually lightens or lessens in density as distance from the center of the spot and of the lagging portion 12 increases. That image incident on layer 18 causes the conductivity of that layer to be much increased in the area 46 indicated by wide spaced lines corresponding to the area 48 of mask 36 and less increased in the areas closer to area 50 corresponding to spot 44. At area 50 the increase in conductivity is the least. As a result the electric field intensity thus the index of refraction of layer 20 in section 52 is higher than that at section 54 corresponding to area 50. The lagging portion 12 of wavefront 10 therefore encounters a lower index of refraction than the rest of the wavefront. Since the index of refraction of a medium is inversely proportional to the speed of radiation in it, the radiation constituting portion 12 of wavefront 10 moves through layer 20 with less reduction in speed than the rest of the wavefront. The result is that upon emerging from layer 20 lagging portion 12 is aligned with the remainder of wavefront 10 as indicated by wavefront 10'. Device 16 may be permanently incorporated as a part of system 14. If device 16 is to be operated as a real time device the image of the mask must be continually present; if it is to be operated as a storage device, i.e. layer 20 is an electrical blocking layer, then once the proper image has been provided to layer 18 and the charge pattern has been stored, the rest of the apparatus may be removed. Such a storage device may be erased by subsequent exposure and used again.

This invention may also be applied to produce optical elements of various characteristics such as lenses and the like, as shown in FIG. 2 where wavefronts 58 of proper contour from radiation source 60 are transmitted through partially reflecting mirror 62 to device 64. Device 64 may include a photoconductive layer 66 and an electro-optic layer 68 which is not an electrical insulator, positioned between a pair of electrodes 70, 72 energized through switch 74 by battery 76. An image of mask 78 irradiated by radiation source 80 is projected by lens 82 to mirror 62 which reflects the radiation to layer 66. Mask 78 is a transparency containing a plurality of dark spots 84 which are darkest at their centers and become progressively lighter or less dense as distance from their centers increases until they reach the background density 86 of the mask 78. The image of mask 78 causes the conductivity of layer 66 to vary in a pattern similar to that of the density pattern of the mask. In area 88 struck by more intense radiation from background 86 the conductivity is higher than in areas 90 struck by less intense radiation from spots 84. Therefore in area 88 charges migrate through layer 66 more readily than in areas 90. The charges continue to migrate through layer 68 because it is not an insulator, so that the electric field across area 92 of layer 68 is more than that cross areas 94 corresponding to spots 84. The increased electric field intensity at areas 92 produces an increase in the index of refraction at those areas which causes a decrease in the speed of radiation through those areas. The result is a wavefront 96 having a number of leading portions 98 corresponding in position and magnitude with the position and density of spots 84: the wavefronts 96 have a contour controlled by the image of mask 78.

A device according to this invention may be used as a continuous correction element in a long path interferometric arrangement for correcting deformation of a telescope mirror shown in FIG. 3. Spherical telescope mirror 100 receives light from a distant object and provides an image thereof to eye 102 by means of mirror 104 and lenses 106, 108; single arrow rays 110, 112. Radiation from laser 126 is transmitted by partially reflecting mirror 118 to partially reflecting mirror 116. Thence, a portion of the radiation is transmitted to mirror 128 and back to mirrors 116. Another portion of the radiation is reflected by mirror 116 to convex mirror 114 which is situated so that its focal point coincides with the center of curvature R of mirror 100. Thus the radiation transmitted from mirror 114 to mirror 100 is incident normally on mirror 100 and is reflected back along the same path. The optical path length between mirrors 116 and 128, and between mirrors 116 and 100 is similar so that the portions of radiation reflected back to mirrors 116 from mirror 128 and 100 form an interference pattern in which the intensity of light is representative of small imperfections or distortions in mirror 100. By reflection from mirror 118 this interference pattern is formed on TV camera 120. The intensity pattern incident at camera 120 is converted to electrical signals and delivered on lines 130, 132 to cathode ray tube (CRT) 134 through control circuit 136 which controls operation of both camera 120 and CRT 134. The reproduction produced by CRT 134 of the pattern observed by camera 120 is projected on to device 138 through electrode 140 by lens 142 and partially reflecting mirror 144. Device 138 contains a layer 137 which is both a photoconductive medium and an electro-optic medium and a layer 146 which is an electrically blocking layer. The conductivity pattern established in device 138 by the incident image establishes a similar pattern in the electric field across photoconductive electro-optic layer 137 included with layer 146 between electrodes 140 and 148 energized by battery 150 through pronounced. 152. In device 138 in contradistinction to devices 16 and 64, more intense radiation incident on layer 137 causes an increase in conductivity but a reduction in the electric field across the electro-optic medium and results in the electro-optic characteristic being less pronounced, whereas less intense radiation incident on layer 137 causes less of an increase in conductivity and less of a decrease in the electric field across the electro-optic medium which results in the electro-optic characteristic being more The radiation reflected from mirror 144 is effective to vary the conductivity of layer 137 but the radiation from mirror 104 is not effective for that purpose and passes through layer 137 without changing its conductivity. However, the wavefronts containing the radiation from mirror 104 have their contours varied in accordance with the variations in the index of refraction of layer 146. Thus, even though the shape of spherical mirror 100 may be distorted by ambient temperature variations or other conditions, the distortions introduced into the wavefronts directed toward eye 102 are offset by the variations of the index of refraction of layer 146 so that the wavefronts forming the image actually seen by eye 102 are properly shaped.

Since, as described, the system of FIG. 3 cannot detect whether wavefront deformations are lagging or leading, hollows of bumps, the deformations are assumed to be always in one of those directions. When that is not a workable assumption, additional components may be required. For example, a motor 160, shown in phantom, may be used to vibrate mirror 128 normal to its surface to provide a modulated interference pattern, the phase of which depends upon the sense of the deformation. The phase relationship may be sensed by providing control unit 136 with a reference signal from oscillator 162 representative of the sense in which mirror 128 is being moved. The intensity of the interference pattern at a suitable number of points in successive television frames is compared in the control unit, and the corresponding points on the CRT 134 brightened or darkened accordingly. For example assuming that the two paths i.e. from mirror 118 through mirror 116 to mirror 128 and back again to mirror 118, and from mirror 118 via mirrors 116 and 114 to mirror 100 and back the same way to mirror 118 by one-half λ there is destructive interference and TV 120 is generally uniformly dark. A deformation occurring in mirror 100 in the form of a bump results in a bump in the wavefronts subsequently reflected from mirror 100. The wavefront bump arrives at TV 120 ahead of the rest of the wavefront and lessens the destructive interference so that a bright spot occurs at the area corresponding to the bump. If the distortion were a hollow the hollow of the wavefront reaches TV 120 after its wavefront and so also causes a brighter spot. To distinguish the bumps from the hollows mirror 128 is moved to provide a sinusoidal variation in intensity at TV 120. When the mirror 128 is positioned so that the one-half λ difference obtains TV 120 is dark but as the mirror 128 moves in either direction from that position, i.e. toward or away from mirror 118, TV 120 begins to brighten uniformly. Control 136 connected with oscillator 162 and TV 120 is always informed as to which sense of direction of mirror 128 is causing a uniform increase in brightness at TV 120. If, then TV 120 is becoming uniformly more bright, as mirror 128 moves toward mirror 118, and a spot on TV 120 begins to grow darker that spot represents a bump and if TV 120 is becoming uniformly more bright as mirror 128 moves away from mirror 118, and a spot on TV 120 begins to grow darker that spot represents a hollow.

Other embodiments will occur to those skilled in the art and are within the following claims:

What is claimed is:

1. A variable optical device for varying the shape of a wavefront comprising:
   an electro-optic medium whose index of refraction varies as a function of the intensity of an applied electric field;
   means for sensing the shape of a wavefront
   means for applying to said electro-optic medium an electric field whose intensity varies in a pattern that produces a spatial variation of the index of refraction of said electro-optic medium, said means for applying being responsive to said means for sensing to thereby modify the shape of said wavefront as it passes through said electro-optic medium.

2. The device of claim 1 in which said means for applying includes a photoconductive medium associated with said electro-optic medium.

3. The device of claim 1 in which said means for applying includes an electrical blocking medium in a first layer and the photoconductive characteristic of a medium which is both a photoconductive and an electro-optic medium in a second layer.

4. The device of claim 2 in which said means for applying further includes a pair of electrodes with said mediums included between them and means for providing a voltage across said electrodes.

5. The device of claim 4 in which said means for applying further includes means for projecting on to said photoconductive medium an image whose intensity varies in a predetermined pattern representative of the pattern of variation of the index of refraction required to shape an incident wavefront.

6. The device of claim 5 in which said means for projecting includes lens means for focusing the image at the photoconductive medium.

7. The device of claim 5 in which said means for projecting includes beam joiner means for simultaneously directing the wavefront to be modified to said electro-optic medium and the image, whose intensity varies in a predetermined pattern, to said photoconductive medium.

8. The device of claim 7 in which the radiation of both said wavefront and said image are transmitted by said photoconductive medium and said photoconductive medium is sensitive only to said image radiation to change its conductivity.

9. The device of claim 5 in which said means for projecting includes a mask having a density that varies in said predetermined pattern.

10. The device of claim 5 in which said means for applying includes means for sensing distortions of a wavefront and establishing an image whose intensity varies in said predetermined pattern.

11. The device of claim 2 in which said electro-optic medium and said photoconductive medium are included in adjacent layers of separate materials.

12. The device of claim 2 in which said electro-optic medium is an electrical insulator.

13. A method for varying the shape of a wavefront comprising sensing the shape of said wavefront and applying to an electro-optic medium, whose index of refraction varies as a function of the intensity of an applied electric field, an electric field whose intensity varies in a pattern that produces a spatial variation of the index of refraction of said electro-optic medium resulting in a desired variation in the shape of a wavefront producible by said electro-optic medium.

14. Variable electro-optical apparatus for compensating for distortion in an optical system comprising:
   means for detecting distortion of a waveform from a said optical system;
   an electro-optic medium whose index of refraction varies as a function of the intensity of an applied electric field;
   means for applying an electric field to said electro-optic medium;
   means for submitting said wavefront to said electro-optic medium;
   means, responsive to said means for detecting distortion, for varying the electric field applied to said electro-optic medium to produce a variation in the index of refraction of said electro-optic medium to compensate for the distortion in the waveform.

15. The apparatus of claim 14 in which said means for detecting distortion includes interferometer means for creating an interference pattern with a wavefront.

16. The apparatus of claim 15 in which said means for detecting distortion further includes electronic camera means for sensing said interference pattern.

7. The apparatus of claim 16 in which said means for varying includes a cathode ray tube responsive to said electronic camera means for providing a pattern for compensating for detected distortion.

18. The apparatus of claim 17 in which said means for applying includes a photoconductor medium associated with said electro-optic medium, whose conductivity varies as a function of the intensity of incident radiation.

19. The apparatus of claim 18 in which said means for applying further includes a pair of electrodes with said mediums between them and means for providing a voltage occurs said electrodes.

20. The apparatus of claim 19 in which said means for varying further includes means, responsive to said means for creating, for directing said radiation pattern to said photoconductive medium.

21. The apparatus of claim 20 further including means for determining whether a particular distortion lags or leads its wavefront.

22. The apparatus of claim 21 in which said means for determining includes means for introducing a prescribed intensity variation in the interference pattern, and means for resolving distortions detected with said interference pattern against said prescribed variation.

* * * * *